US008082201B2

(12) United States Patent
Nahum (10) Patent No.: US 8,082,201 B2
(45) Date of Patent: Dec. 20, 2011

(54) GRAPHICAL SYSTEM FOR DETERMINING THE RELATIVE ATTRACTIVENESS OF INVESTMENTS

(75) Inventor: Vincent Nahum, Neuilly-sur-Seine (FR)

(73) Assignee: Infinancials SA (FR)

( * ) Notice: Subject to any disclaimer, the term of this patent is extended or adjusted under 35 U.S.C. 154(b) by 0 days.

(21) Appl. No.: 12/971,642

(22) Filed: Dec. 17, 2010

(65) Prior Publication Data

US 2011/0087620 A1 Apr. 14, 2011

Related U.S. Application Data

(63) Continuation of application No. 12/132,849, filed on Jun. 4, 2008, now Pat. No. 7,882,001.

(60) Provisional application No. 61/025,528, filed on Feb. 1, 2008, provisional application No. 61/038,203, filed on Mar. 20, 2008.

(51) Int. Cl.
*G06Q 40/00* (2006.01)

(52) U.S. Cl. ......................................................... 705/35

(58) Field of Classification Search ...................... 705/35
See application file for complete search history.

(56) References Cited

U.S. PATENT DOCUMENTS

| 7,268,782 | B2 | 9/2007 | Ebert | |
|---|---|---|---|---|
| 2002/0052820 | A1* | 5/2002 | Gatto | 705/36 |
| 2002/0059126 | A1* | 5/2002 | Ricciardi | 705/36 |
| 2008/0027880 | A1* | 1/2008 | Yu | 705/36 R |
| 2008/0249957 | A1 | 10/2008 | Masuyama et al. | |

OTHER PUBLICATIONS

Wheeler, Bradley C, et al. "Groupware Comes to the Internet: Charting a New World", http://bpastudio.csudh.edu/fac/Ipress/articles/gware.htm, May 12, 1999, 23 pages.

Learning Architecture: 03 "Learning Architecture Online: New directions for distance education and the design studio", http://info.umuc.edu/mde/Projects/Stover/home.comcast.net/_abstover/learning_arch/learning_arch_03.html, retrieved from Internet on Mar. 10, 2008, 17 pages.

Christine Benz; "Midyear Portfolio Chekup in Five Steps"; Morningstar Column; Jun. 13, 2006.

LibQUAL + TM 2003 Survey Results—University of Victoria Libraries, "Survey Item Summary for University of Victoria Libraries", 1 page.

Sheloe, Roger M; Anderson, Dwight C; "The financial performance of REITs following initial public offerings", The Journal of Real Estate Research, v16n3 pp. 375-387 1998.

Craig, Ben; Santos, Joao Cabral dos; "The risk effects of bank acquisitions"; Economic Review (Federal Reserve Bank of Cleveland), v 33, n 2, p. 25-35 Second Quarter 1997.

* cited by examiner

*Primary Examiner* — Charles Kyle
*Assistant Examiner* — Michael Cranford
(74) *Attorney, Agent, or Firm* — St. Onge Steward Johnston & Reens LLC (57) ABSTRACT

A system for scoring and evaluating financial investments including a server, at least one database in communication with the server including a plurality of financial indicators for a plurality of investments, each of the financial indicators assignable to one of at least two categories, software executing on the server for generating a display of scores for each of at least two of the financial indicators for a target investment, the display including a radar chart including a ray extending radially from a center point of the radar chart for each of the at least two of the financial indicators, wherein each of the scores is plotted along one of the rays, and wherein the radar chart is divided into two or more sections wherein each of the sections corresponds to one of the categories.

20 Claims, 6 Drawing Sheets

GRAPHICAL SYSTEM FOR DETERMINING THE RELATIVE ATTRACTIVENESS OF INVESTMENTS

CROSS-REFERENCE TO RELATED APPLICATIONS

This application is a continuation of U.S. patent application Ser. No. 12/132,849, filed Jun. 4, 2008 now U.S. Pat. No. 7,882,001 which claims priority benefits under 35 §U.S.C. 119(e) of the U.S. Provisional Application No. 61/025,528, filed on Feb. 1, 2008 and U.S. Provisional Application No. 61/038,203, filed on Mar. 20, 2008, each of which is incorporated herein by reference.

FIELD OF THE INVENTION

The disclosure relates to the field of finance and stock investment, and in particular relates to the implementation of a computerized quantitative analysis model and charting system for providing indicators of the relative attractiveness of worldwide stocks using a multi-factor scoring methodology.

BACKGROUND OF THE INVENTION

The evaluation of stocks and other financial investments is a complex issue. A number of methods and strategies to rank stocks have been developed but they suffer from a number of limitations. For example, most stock ranking models in the prior art focus on a single approach—being typically growth or value oriented—without taking into accounts all factors that drive a stock's attractiveness. The purpose of many models is to help investors in the selection of stocks and the construction of portfolios that theoretically outperform the market, but in doing so they introduce a bias into the investment strategy and allow little adaptation to the personal investment strategy of the investor.

The universe of stocks considered by prior art methods is generally quite limited and usually covering only one country and/or few indices thus reducing their effectiveness. When stocks are ranked, they are often ranked against each other within a fixed universe with little consideration given to the investment universe of the investor. There is little focus given to the comparison of the relative attractiveness of industry peers and, when done, they suffer from the lack of accurate peer groups. Furthermore, stock scores or ranks used in the prior art are often described by a set of numbers which are difficult and time-consuming to interpret. Some prior art methods summarize stocks visually using use a star-based rating which oversimplifies the analysis.

There is a desire for a system and method for evaluating financial investments that overcomes the limitations of the prior art.

SUMMARY OF THE INVENTION

It is accordingly an object of the present invention to provide a system and method that provides investors with an evaluation of the relative attractiveness of a financial investment in a consistent, objective, and easy-to-understand form.

It is a further object to complement numerical investment data with an innovative chart that offers a graphical and dynamic view of the stock's attractiveness, enabling the investor to understand the analysis at a glance. The chart preferably summarizes a large range of financial indicators computed in a consistent manner across a global universe of worldwide stocks and arranged in several meaningful categories.

It is a further object to provide a system and method to quickly compare a stock's attractiveness to other stocks in the same industry or sector. By adding a peer comparison approach, investors can immediately compare the relative attractiveness of industry peers and detect stocks that stand out from the competition. It is a further object to allow investors to dynamically select the reference universe of financial investments and a comparison set.

These and other objectives are achieved by providing a system for scoring and evaluating financial investments including a server accessible by at least one client, at least one database in communication with the server including a plurality of financial indicators for a plurality of investments, each of the financial indicators assignable to one of at least two categories, software executing on the server for generating a score for each of at least a portion of the financial indicators for a target investment relative to a reference set of the investments, software executing on the server for determining a comparison set including at least one of the plurality investments, software executing on the server for generating a score for the portion of the financial indicators for the comparison set relative to the reference set, and software executing on the server for generating a display of the scores for the target investment. The display includes a chart including an axis extending radially from a point for each of the portion of the financial indicators. Each of the scores is plotted along one of the axes and the chart is divided into two or more sections wherein each of the sections corresponds to one of the categories.

In some embodiments, the chart includes a first continuous line connecting each of the scores for the target investment and second continuous line connecting each of the scores for the comparison set. An area defined within the first continuous line is indicative of the attractiveness of the target investment.

The reference set may be, for example, one of an industry, supersector, or sector that comprises the target investment, and the comparison set may be one of the sector or a subsector that comprises the target investment. In some embodiments, the comparison set is selectably determined by the at least one client. The comparison set may also consist of a selected group of peer investments in competition with the target investment. The comparison set may also be a single stock or company.

Further provided is a system for scoring and evaluating financial investments, including at least one database including a plurality of financial indicators for a plurality of investments, each of the financial indicators assignable to one of at least two categories, software executing on a computer for generating a score for each of at least a portion of the financial indicators for a target investment relative to a reference set of the investments, software executing on the computer for determining a comparison set including at least one of the plurality investments, software executing on the computer for generating a score for the portion of the financial indicators for the comparison set relative to the reference set, software executing on the computer for generating a display of the scores for the target investment, wherein the display includes a chart including an axis extending radially from a point for each of the portion of the financial indicators, wherein each of the scores is plotted along one of the axes, and wherein the chart is divided into two or more sections wherein each of the sections corresponds to one of the categories.

Further provided is a method for scoring and evaluating financial investments including the steps of receiving a selection of a target investment, determining a reference set of investments, receiving a plurality of financial indicators for the target investment and the reference set of investments, generating a score for each of at least a portion of the financial indicators for the target investment relative to the reference set, determining one or more comparison investments, generating a numerical score for the portion of the financial indicators for the comparison investments, generating a display including a chart including an axis extending radially from a point for each of the portion of the financial indicators, wherein the chart is divided into two or more sections wherein each of the section corresponds to a category of financial indicators, and displaying each score along the axis corresponding to the financial indicator pertaining to the score. The scores displayed for the target investment are compared to the scores displayed for the comparison investments to determine the relative attractiveness of the target investment.

In some embodiments, the step of generating a numerical score includes generating a table for each financial indicator including an actual value of the financial indicator for each of the target investment and the reference set, sorting the actual values from lowest to highest, and distributing the values into ten groups of equal size.

Other objects of the invention and its particular features and advantages will become more apparent from consideration of the following drawings and accompanying detailed description.

DETAILED DESCRIPTION OF THE INVENTION

Figure 1A:
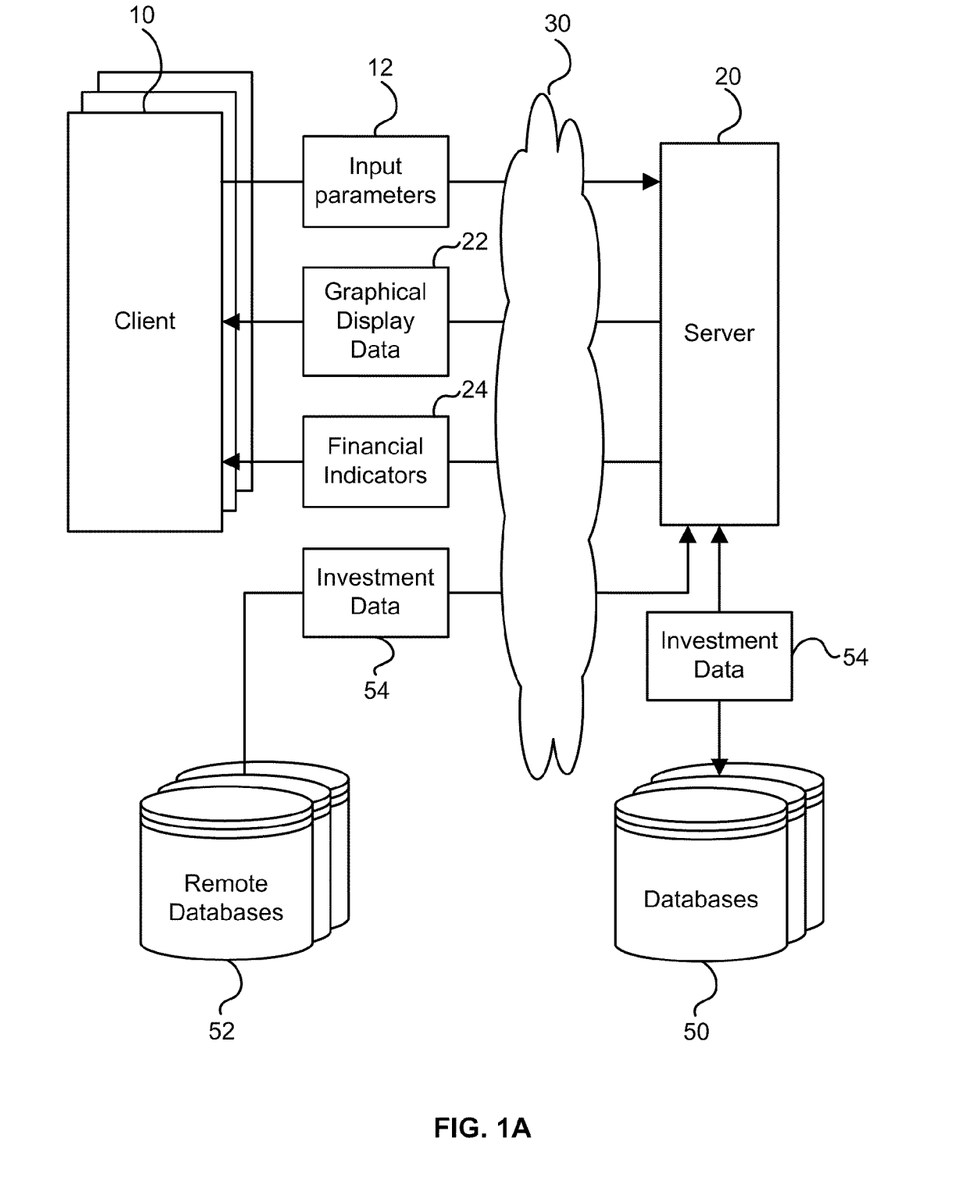
FIG. 1A illustrates a system for scoring and evaluating financial investments according to an exemplary embodiment of the present invention.

FIG. 1A illustrates a system for scoring and evaluating financial investments according to an exemplary embodiment of the present invention. The system includes a server 20 accessible by any number of clients 10 (e.g., investors) via a communication network 30 such as the Internet. In some embodiments, the server 20 may be a personal computer that is accessible (via the communications network 30 or directly) by a single client or multiple clients. The system further includes one or more databases 50 including investment data 54 including data and indicators pertaining to a plurality of financial investments such as stocks and securities. The databases 50 provide the system with historical and forecast fundamental and market data for approximately 20,000 or more listed companies worldwide.

In some embodiments, investment data 54 may be generated or determined by the system or administrators thereof. In preferred embodiments, the investment data 54 is collected from a plurality of data providers and/or remote databases 52 and updated regularly and/or continuously. The system receives the investment data 54 and processes the investment data 54 for use by the system. For example, a number of filters may be applied with the purpose of excluding the companies with data gaps. The system may also fill in any data gaps with investment data 54 from different sources. A rigorous accounting standardization process of companies' financial statements may also be employed to ensure consistent calculation of all indicators across a universe of financial investments covered by the system.

The system also computes a plurality of different financial indicators (e.g., twenty to forty) for each investment belonging to the universe of financial investments based on the investment data 54. For example, the system may compute ratios of investment data, aggregate investment data from different sources, combine historical and forecast investment data or ratios, etc. Some of the financial indicators used by the system may be included in the investment data 54 and no further computation is required. The system groups the financial indicators into several categories for determining the attractiveness (e.g., good buy) of particular target investments or stocks. For example, the financial indicators may be grouped into four categories including growth, profitability, risk and value. In other embodiments, the financial indicators are grouped into two or more categories or three or more categories.

The system determines a select number of representative financial indicators for each of the categories to use in graphically evaluating the attractiveness of financial investments. The financial indicators may be historical or forecast. In some embodiments, three or more representative financial indicators are used. In some embodiments, no more than ten representative financial indicators are used. The following financial indicators are provided by way of example only, and thus are not limitative of the present invention.

The growth indicators used by the system may include, e.g., net sales growth (historical and forecast), net income growth (historical and forecast), earnings per share ("EPS") estimate, inventories growth, price to earnings ("PE") per share for the next twelve months ("NTM"), and accounts receivable and payable growth.

The profitability indicators may include, e.g., return on equity ("ROE"), earnings before interest and taxes ("EBIT") margin (historical and forecast), return on capital employed ("ROCE") (historical and forecast), dividend yield (historical and forecast), operating margin (historical and forecast), and free cash flow margin (historical and forecast).

The risk indicators may include, e.g., historical volatility, daily volume average, size of market capitalization (historical and forecast), Net debt to market capitalization (historical and forecast), liquidity, and capital structure indicators (historical and forecast), and Beta. As one of ordinary skill in the art will understand, the Beta indicator is a quantitative measure of the volatility of a stock relatively to the volatility of the market.

The value indicators may include, e.g., PE (historical and forecast), enterprise value ("EV") to net sales (historical and forecast), EV to earnings before interest, taxes, depreciation and amortization ("EV/EBITDA") (historical and forecast), EV to EBIT ("EV/EBIT") (historical and forecast), price to book (historical and forecast), price to cash flow (historical and forecast), and price to earnings growth ratio.

In one preferred embodiment, the growth indicators include at least net sales growth, EBIT growth, and EPS growth, the profitability indicators include at least EBIT margin ROCE or ROE, the risk indicators include at least volatility, and net debt to market cap, and the value indicators include at least PE, EV/EBITDA, and EV/EBIT.

Figure 1B:
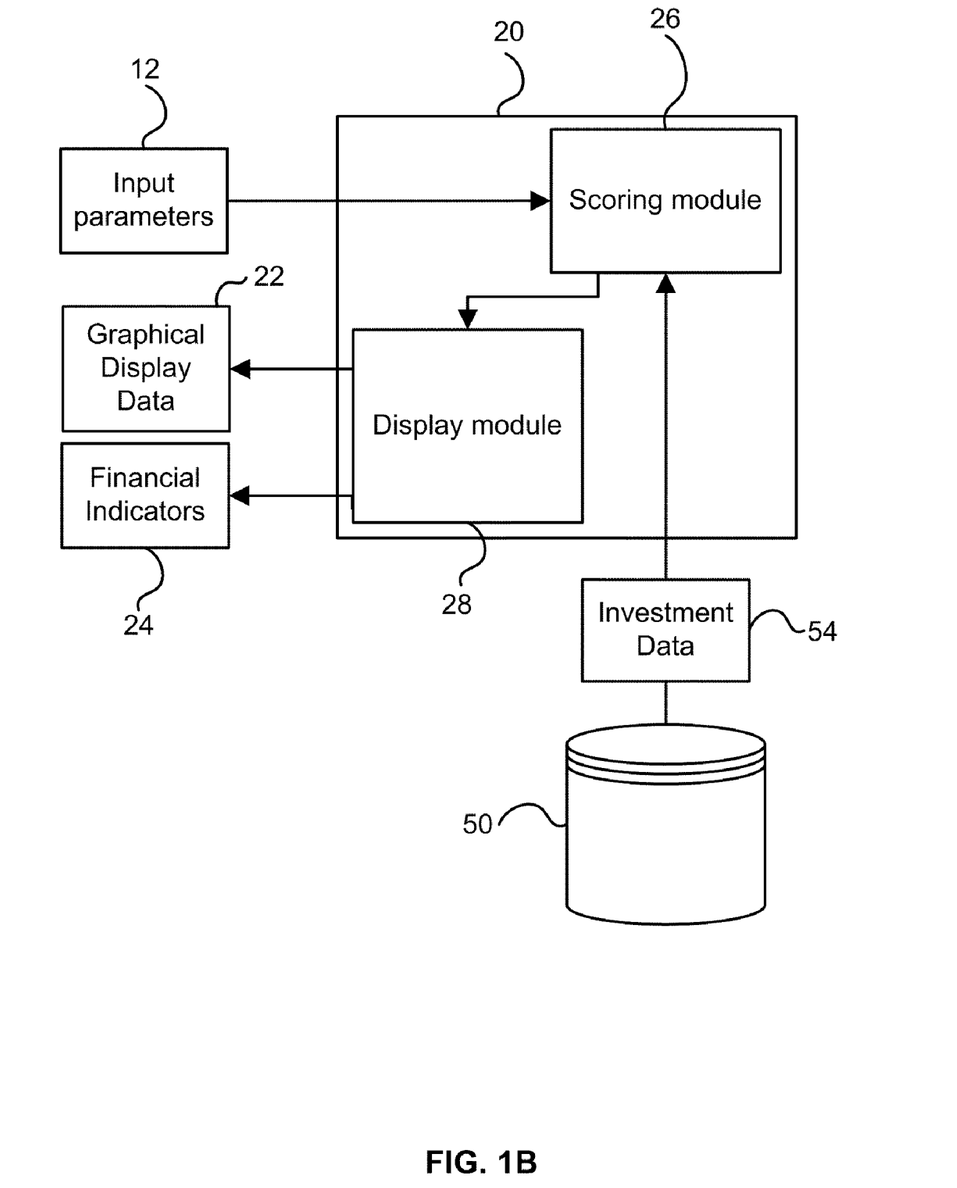
FIG. 1B illustrates an exemplary server of the system shown in FIG. 1A.

Shown in FIG. 1B, the system further includes any number of software modules including, e.g., a scoring module 26 for generating scores for target and comparison investments and a display module 28 for generating displays for the client 10. The system may include any number of additional software modules including, for example, modules for receiving and processing input parameters 12 and data from clients 10 and third party providers, and one or more modules for calculating the financial indicators used by the system. A target investment or target stock may be selected by a client 10 via a user interface of the system. For example, the system preferably includes an Internet based user interface for receiving user input or parameters 12 and providing the client 10 with graphical display data 22 and financial indicators 24. After receiving the selection of a target stock, the system calculates scores for the target stock and one or more comparison stocks.

Figure 2:
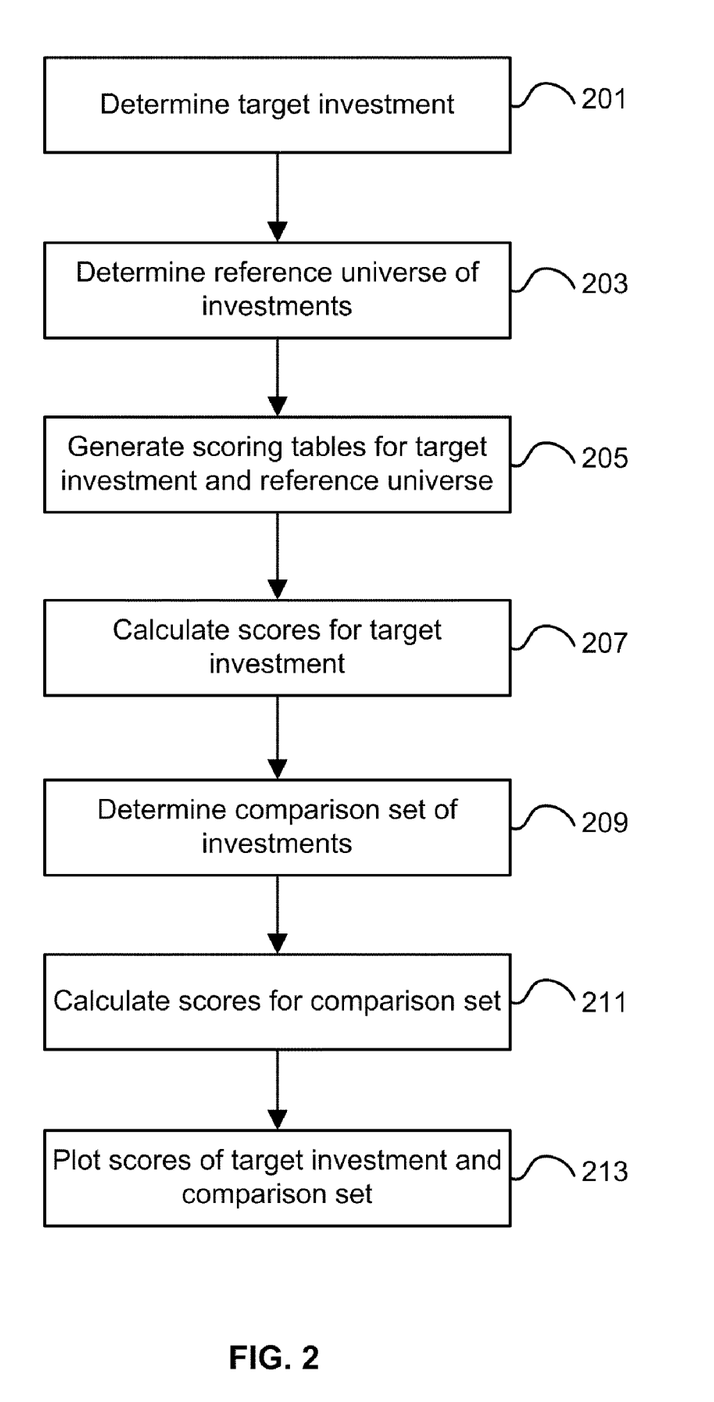
FIG. 2 illustrates a method for scoring and evaluating financial investments employable by the system shown in FIGS. 1A-1B.

FIG. 2 illustrates an exemplary method for scoring and evaluating financial investments that may be used by the system shown in FIGS. 1A and 1B. A target stock is first determined by client selection or otherwise, then a reference universe or reference set of stocks is determined (Steps 201-203). The reference set allows for the scores of the target stock to be computed relative to a group of companies. The reference set is generally a subset of the universe of stocks, securities and/or companies from which the target stock is selected. The system preferably determines a default reference set such as all stocks belonging to the same industry or supersector, sector or subsector of the industry as the target stock. The industry, supersector, sector and subsector of the target stock are preferably determined according to a classification system such as the Industry Classification Benchmark ("ICB"), the Global Industry Classification Standard ("GICS"), or other comparable classification systems.

The reference set may be adjusted by the client before or during analysis of a target stock. The client 10 can provide input parameters to select a broader reference set (e.g., all stocks), apply filters to further narrow the reference set, or otherwise define a personal investment reference set. For example, a client 10 may restrict the reference set to companies in a particular region, companies of a particular size, a subsector, etc. The client 10 may also use his/her own portfolio as the reference set. As will be better understood after reading the remainder of the description below, a change in the reference set during analysis of stock will generally require a recalculation of the scores for the target stock and comparison set. However, the system preferably accomplishes this in real time and thus allows users to quickly change between reference sets.

Scoring tables are produced for each financial indicator to be considered by the system by calculating the actual value of the indicator for the target stock and all stocks in the reference set (Step 205). For most financial indicators, the actual value, or absolute value, of the indicator is then adjusted into a relative score. Each score is preferably a number (e.g., 0-10, 0-100, etc.) indicative of a relative comparison between the actual value of a particular financial indicator for the target stock and the actual values of the same financial indicator for each of the companies in the reference set. A low score for the indicator indicates that the corresponding stock has a less attractive indicator than most other stocks within the reference set; conversely a high score is a sign of greater attractiveness.

To determine the scores, actual values inputted into the scoring table are sorted from lowest to highest and then distributed into a plurality of groups, such as ten (10) groups of equal size (deciles). Next, the scores are calculated for the target stock by converting the actual value for each indicator into a relative score based on the decile to which it belongs (Step 207). It should be noted that it may be required to use the inverse of some financial indicators in determining the scores to ensure that a high score is always a positive indication. For example, with at least some or all risk financials indicators, the system will use an inverse so that lower risk is attributed with higher scores. Similarly, at least some or all value financials indicators, the system will use an inverse so that lower or under valued stocks are attributed with high scores.

After scores are determined for the target stock, the scores may be plotted on a radar chart as described in more detail below. However in preferred embodiments, scores for a comparison stock or comparison set of stocks are also calculated to be plotted together with the target stock scores on the radar chart.

A comparison set of stocks is determined by the system and/or client input parameters 12 (Step 209). The comparison set may be dynamic according to user input parameters 12 or, if desired, a static set used for all target stock evaluations. The client 10 can select another single stock, a group of peer companies of the target stock (e.g., competitors, comparable companies with similar business activities, etc.), or a personal list of stocks (e.g., client's stock portfolio). Alternatively, the client 10 can select that no comparison set be used. Several different peer groups may be available for selection including but not limited to international peers, domestic peers or regional peers. In some embodiments, peers to the target stock are determined using methods described in commonly owned U.S. patent application Ser. No. 11/041,294 incorporated herein by reference. Scores are then calculated for the comparison set of stocks (Step 211). This is done by computing the value of each financial indicator for each of the stocks in the comparison set. An aggregate value is then calculated for each financial indicator using either a median or mass average technique to determine the particular score (e.g., aggregate score) for the comparison set. In some embodiments, the particular aggregation method may be selected by the client 10 via input parameters 12.

The scores for the target stock and the comparison set are displayed on a chart (Step 213). Each of the scores is plotted on an axis or ray corresponding to the financial indicator represented by the score. A line may be generated on the chart connecting each of the scores for the target investment. In some embodiments, the area within the line is colored or shaded. A second line may also connect the scores for the comparison set. The attractiveness of the target stock relative to the reference set and the comparison set can then be determined from the plotted scores and the size of the shaded area.

An overall score can also be calculated for each category in order to give a macro level indication of attractiveness. The overall score for each category is calculated by aggregating the scores of each indicator within the particular category. For example, the scores may be averaged to determine the overall score. Alternatively, any number of complex aggregation methods may be used as desired to determine the overall score. Overall scores may be calculated for the target stock and for the comparison set and displayed on the chart. Actual values for each financial indicator may also be displayed to provide the client with a more detailed analysis of attractiveness.

Figure 3:
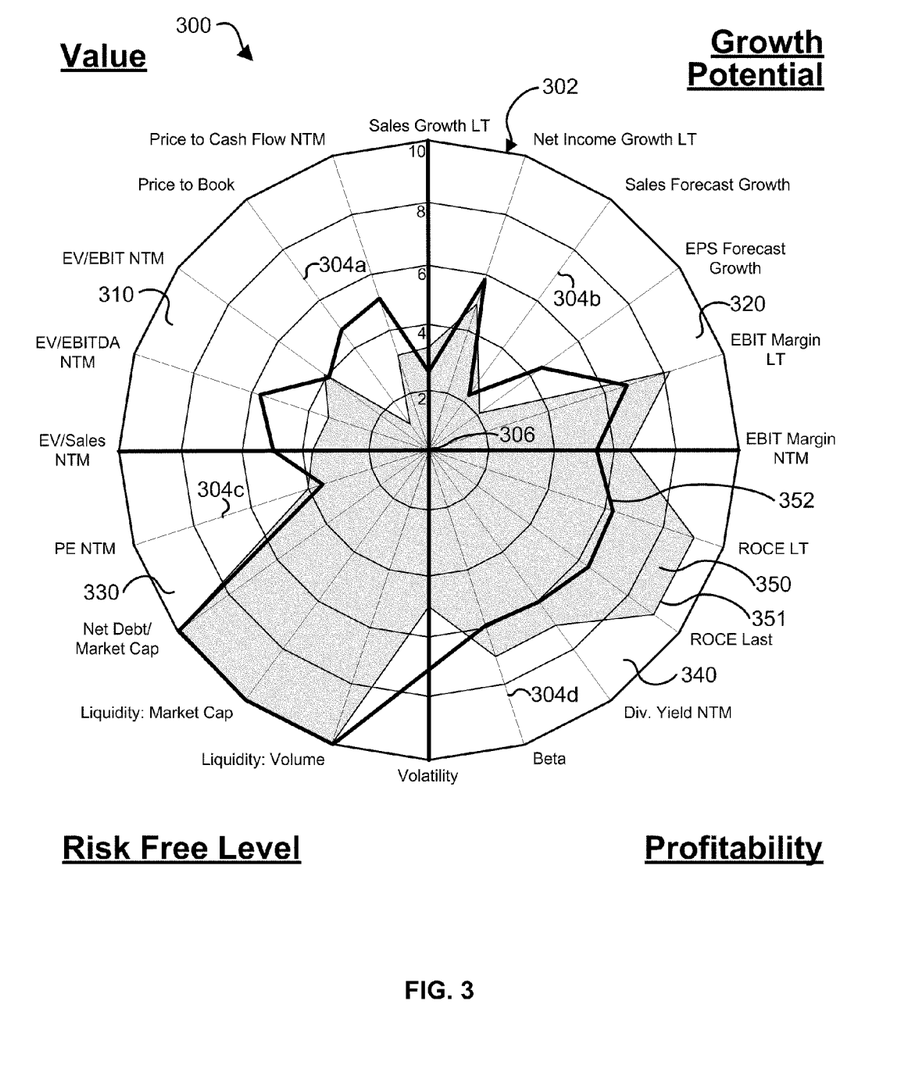
FIG. 3 illustrates an exemplary display generated by the system shown in FIGS. 1A-1B.

FIG. 3 illustrates an exemplary display 300 generated by the system. Scores are presented to the client 10 in an innovative radar chart 302 that visually pinpoints strong and weak areas of the target stock compared to other stocks in the reference group. The radar chart 302 shows the scores, each corresponding to a financial indicator, calculated by the system for the target stock and/or the comparison set. The chart 302 includes a plurality of axes or rays (e.g., 304a-d) extending radially from a center and/or a point 306 on the chart. One axis or ray is included for each of the representative financial indicators. Scores close to the center indicate a low value for the corresponding indicators (i.e., weak areas); while points near the edge indicate a high value (i.e., strong areas). The financial indicators are grouped into sectors or quadrants, one for each category, around the radar chart 302. Financial indicators are grouped into the particular categories based on the system's determination that they are indicators for that particular category. The sectors 310/320/330/340 may be colored coded for ease of review by the client 10.

By default, the radar chart 302 shows one data series corresponding to the target stock's scores. The scores are connected by a line 351. The area 350 inside the line 351 is colored coded (e.g., orange) or shaded to make the reading of the radar chart easier. The shape of the area 350 indicates the overall attractiveness or strength of the target stock: the larger the area, the more attractive the target stock. It is also important to check each individual axes when interpreting the radar chart 302: a smooth polygon indicates consistent financial indicators, while spikes are a sign of variability and potential weakness within a particular category.

The system allows clients 10 to compare the target stock against either another stock, or a set of comparable stocks (e.g., peer group), an index, or even any user-defined stock list on the radar chart 302. The display 300 preferably includes one or more features for selecting comparison options and/or generating comparison sets. When comparison options are selected, the additional data series is plotted on the same radar chart 302 as the data series of the target stock. Scores corresponding to a comparison set of stocks are displayed as a line 352. The comparison of shape between the target stock area 350 and the comparison line 352 enables clients 10 to quickly determine whether the target stock is better or worse than comparable stocks and/or companies. The comparison set can be defined and adjusted by the client 10 to allow comparison against a large comparison set such as all international peers of the target stock, a smaller group such as regional peers, or an individual stock. Adjustments and comparison selections may occur prior to the display being generated or in real-time during the client's evaluation of the target stock.

Figure 4:
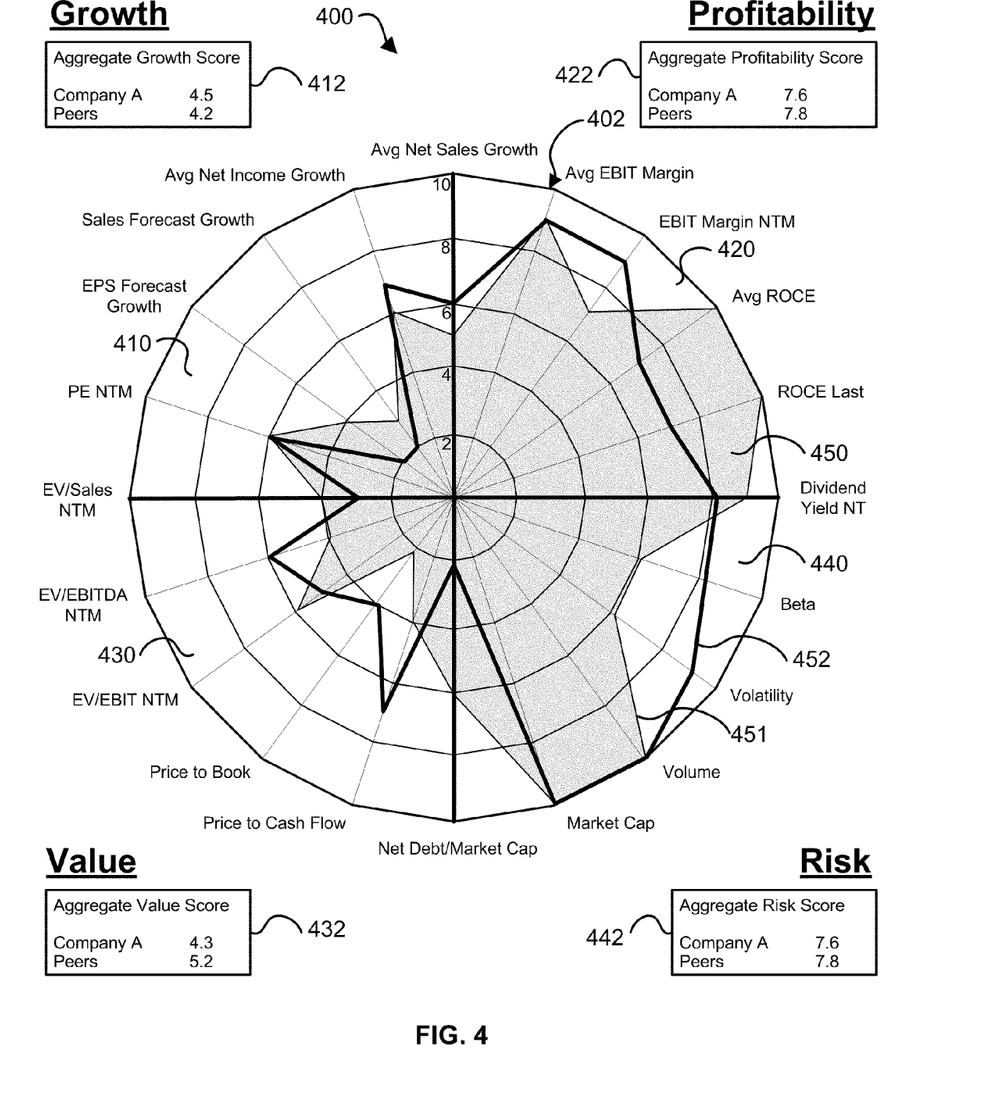
FIG. 4 illustrates another exemplary display generated by the system shown in FIGS. 1A-1B.
Figure 5:
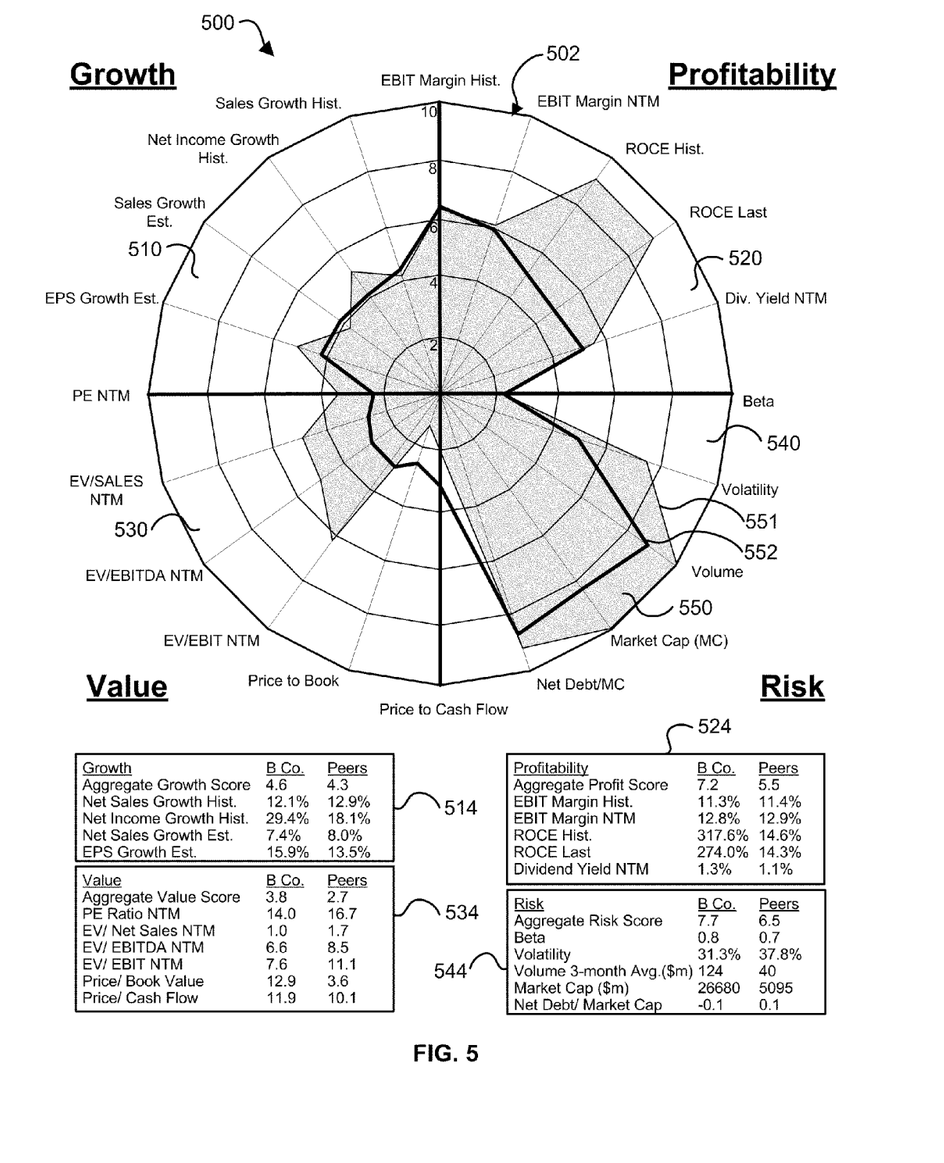
FIG. 5 illustrates another exemplary display generated by the system shown in FIGS. 1A-1B.

FIGS. 4 and 5 illustrate additional exemplary displays 400/500 generated by the system. The displays 400/500 include various data tables providing additional information to the client 10. In FIG. 4, the display 400 includes a data table for each category. The data tables 412/422/432/442 include aggregate scores for each category of scores displayed for the target stock and the comparison set. In particular, the data table 412 includes aggregate scores for the growth category for the target stock (i.e., Company A) and the comparison set (i.e., Peers). Data table 422 includes aggregate scores for the profitability category, data table 432 includes aggregate scores for the value category, and data table 442 includes aggregate scores for the risk category. The aggregate scores provide a numerical reference to quickly compare the target stock and comparison set by category.

In FIG. 5, the display 500 includes the radar chart 502 and data tables 514/524/534/544 including actual values for the financial indicators displayed on the radar chart 502 for the target stock (i.e., B Co.) and the comparison set (i.e., Peers). The data tables shown in FIG. 5 are generally useful when a client 10 would like to view actual data with respect to particular financial indicators in additional to the overall graphical analysis of the target stock. Clients 10 may determine and adjust the level of detail displayed at any given time to assist with his/her evaluation of the target stock. For example, clients 10 can select whether to display data tables including aggregate scores (as shown in FIG. 4), the data tables 514/524/534/544 including actual values of financial indicators plotted on the radar chart, or no data tables. The client 10 may also choose to display all financial indicators and/or detailed investment data.

The displays generated by the system offer numerous levels of interactivity for the client 10. Available properties and features include the ability to dynamically drill-down on any financial indicator enabling a detailed analysis of the calculation of each score to provide a better understanding of the strength or weakness of the stock in any given category. Indicators can be individually enabled or disabled on the radar chart, thus allowing the investor to tailor the display to a subset of preferred indicators. The historical evolution of the scores can also be displayed on the radar chart in an animated manner, to analyze the evolution of the attractiveness of the target stock over time. The system's high-performance computing enables the investor to immediately switch the display of the radar chart from one target stock to another for quick browsing of a stock portfolio. Clients can also display and print a synthetic report providing a summary view of the analysis of the target stock.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for scoring and evaluating financial investments, comprising:
   a server;
   at least one database in communication with the server comprising a plurality of financial indicators for a plurality of investments, each of the financial indicators assignable to one of at least two categories;
   software executing on said server for generating a display of scores for each of at least two of the financial indicators for a target investment, the display comprising a radar chart including a ray extending radially from a center point of said radar chart for each of the at least two of the financial indicators, wherein each of the scores is plotted along one of the rays; and
   wherein said radar chart is divided into two or more sections wherein each of the sections corresponds to one of the categories.

2. The system according to claim 1, wherein each score is a numerical value indicative of a financial indicator of the target investment relative to a reference set of the investments, wherein the reference set is one of an industry, supersector, or sector that comprises the target investment.

3. The system according to claim 1, wherein the radar chart includes a first continuous line surrounding the center point and connecting each of the scores for the target investment.

4. The system according to claim 3, wherein an area defined within the first continuous line is indicative of the attractiveness of the target investment.

5. The system according to claim 1, wherein each of the financial indicators are assignable to one of at least four categories, and wherein said radar chart is divided into four or more sections wherein each of the sections corresponds to one of the categories.

6. The system according to claim 5, wherein the display includes two or more scores in each of the four or more sections.

7. The system according to claim 5, wherein the at least four categories include growth, profitability, risk and value.

8. The system according to claim 7, wherein the growth category includes two or more financial indicators selected from a group consisting of net sales growth, net income growth, an earnings per share estimate, inventories growth, and accounts receivable and payable growth.

9. The system according to claim 7, wherein the profitability category includes two or more financial indicators selected from a group consisting of EBIT margin, return on capital employed, dividend yield, operating margin, and free cash flow margin.

10. The system according to claim 7, wherein the risk category includes two or more financial indicators selected from a group consisting of beta, historical volatility, daily volume average, size of market capitalization, net debt to market capitalization, liquidity, and capital structure.

11. The system according to claim 7, wherein the value category includes two or more financial indicators selected from a group consisting of price to earnings per share, EV to net sales, EV/EBITDA, EV/EBIT, price to book, price to cash flow, and price to earnings growth ratio.

12. The system according to claim 1, wherein said software for generating a display of the scores for the target investment further displays scores for each of at least two of the financial indicators for a comparison set, the comparison set including at least one of the plurality of investments.

13. The system according to claim 12, wherein the radar chart includes a first continuous line surrounding the center point and connecting each of the scores for the target investment and second continuous line connecting each of the scores for the comparison set.

14. The system according to claim 12, wherein the comparison set is one of the sector or a subsector that comprises the target investment.

15. The system according to claim 12, wherein the comparison set consists of a selected group of peer investments in competition with the target investment.

16. The system according to claim 1, further comprising:
a user interface for receiving a selection of the target investment from at least one client.

17. A method for scoring and evaluating financial investments, comprising the steps of:
receiving, on a computer, a selection of a target investment;
generating, via software executing on the computer, a display comprising a radar chart including a ray extending radially from a center point of said radar chart for each of the at least two of the financial indicators;
wherein said radar chart is divided into two or more sections, each of the section corresponding to a category of financial indicators; and
wherein the display includes a score for each of at least two of the financial indicators for the target investment plotted along the ray corresponding to the financial indicator pertaining to the score.

18. The method according to claim 17, further comprising the step of:
displaying a score for each of at least two of the financial indicators for one or more comparison investments along the ray corresponding to the financial indicator pertaining to the score; and
displaying a first continuous line connecting each of the scores for the target investment and second continuous line connecting each of the scores for the comparison investments.

19. The method according to claim 17, wherein each score is a numerical value indicative of a financial indicator of the target investment relative to a reference set of the investments, wherein the reference set is one of an industry, supersector, or sector that comprises the target investment.

20. A system for scoring and evaluating financial investments, comprising:
a server;
at least one database in communication with the server comprising a plurality of financial indicators for a plurality of investments, each of the financial indicators assignable to one of at least four categories;
software executing on said server for generating a score for the at least two of the financial indicators for a comparison set, the comparison set including at least one of the plurality of investments, relative to the reference set;
software executing on said server for generating a display of scores for each of at least two of the financial indicators for a target investment relative to a reference set of the investments, the display comprising a radar chart including a ray extending radially from a center point of said radar chart for each of the at least two of the financial indicators, wherein each of the scores is plotted along one of the rays;
wherein said radar chart is divided into four or more sections wherein each of the sections corresponds to one of the at least four categories; and
wherein the radar chart includes a continuous line surrounding the center point and connecting each of the scores for the target investment.

* * * * *